(12) United States Patent
Yamazaki et al.

(10) Patent No.: US 7,508,305 B2
(45) Date of Patent: Mar. 24, 2009

(54) PACKING MATERIAL, TAG, CERTIFICATE, PAPER MONEY, AND SECURITIES

(75) Inventors: Shunpei Yamazaki, Setagaya (JP); Mai Akiba, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 166 days.

(21) Appl. No.: 11/013,369

(22) Filed: Dec. 17, 2004

(65) Prior Publication Data

US 2005/0140495 A1 Jun. 30, 2005

(30) Foreign Application Priority Data

Dec. 26, 2003 (JP) ............... 2003-431753

(51) Int. Cl.
*G08B 13/14* (2006.01)
(52) U.S. Cl. .................. 340/572.1; 340/572.7
(58) Field of Classification Search ......... 340/572.1, 340/572.4, 572.7, 572.8, 573.1, 10.1, 10.3, 340/10.4, 10.5, 10.51; 235/492, 451; 434/702, 434/700 MS
See application file for complete search history.

(56) References Cited

U.S. PATENT DOCUMENTS

| | | | |
|---|---|---|---|
| 5,198,831 A | 3/1993 | Burrell et al. | |
| 5,403,700 A | 4/1995 | Heller et al. | |
| 5,643,826 A | 7/1997 | Ohtani et al. | |
| 5,698,836 A | 12/1997 | Fujioka | |
| 5,703,755 A | 12/1997 | Flesher et al. | |
| 5,821,138 A | 10/1998 | Yamazaki et al. | |
| 6,100,804 A | 8/2000 | Brady et al. | |
| 6,164,551 A | 12/2000 | Altwasser | |
| 6,239,703 B1 | 5/2001 | Friedman et al. | |
| 6,366,206 B1 * | 4/2002 | Ishikawa et al. ......... 340/573.1 |
| 6,372,608 B1 | 4/2002 | Shimoda et al. | |
| 6,407,669 B1 | 6/2002 | Brown et al. | |

(Continued)

FOREIGN PATENT DOCUMENTS

CN 1257598 6/2000

(Continued)

OTHER PUBLICATIONS

Office Action (Application No. 200410011449.4; CN7641) dated Sep. 28, 2007.

(Continued)

*Primary Examiner*—Van T. Trieu
(74) *Attorney, Agent, or Firm*—Eric J. Robinson; Robinson Intellectual Property Law Office, P.C.

(57) ABSTRACT

A packing material, a tag, a certificate, paper money, and securities, each of which can be surely prevented from counterfeiting or deception. A plurality of wireless tags used for an object such as a packing material, a tag, a certificate, paper money, or securities. The location of the plurality of wireless tags attached to each object is varied on the object such that the object can be identified. Then, the object using the wireless tags is identified by detecting the location of the plurality of wireless tags attached to each object. The more random the locations of the wireless tags, the more certain it becomes to identify the object and to prevent or detect the counterfeiting of the object or deception.

35 Claims, 12 Drawing Sheets

U.S. PATENT DOCUMENTS

| | | |
|---|---|---|
| 6,468,835 B1 | 10/2002 | Blanc et al. |
| 6,478,229 B1 | 11/2002 | Epstein |
| 6,509,217 B1 | 1/2003 | Reddy |
| 6,521,489 B2 | 2/2003 | Duthaler et al. |
| 6,774,470 B2 | 8/2004 | Yagi et al. |
| 6,827,279 B2 * | 12/2004 | Teraura ............... 235/492 |
| 6,870,461 B2 | 3/2005 | Fischer et al. |
| 6,943,437 B2 | 9/2005 | Blanc et al. |
| 6,980,087 B2 * | 12/2005 | Zukowski ............. 340/10.51 |
| 6,994,250 B2 * | 2/2006 | Al Amri ............... 235/375 |
| 6,994,414 B2 | 2/2006 | Hashimoto et al. |
| 7,000,837 B2 * | 2/2006 | Akiho et al. ............. 235/451 |
| 7,014,120 B2 * | 3/2006 | Al Amri ............... 235/487 |
| 7,036,741 B2 * | 5/2006 | Usami et al. ............. 235/492 |
| 7,037,752 B2 | 5/2006 | Kuwabara et al. |
| 7,050,007 B2 * | 5/2006 | Akiho et al. ............. 343/702 |
| 7,051,205 B1 * | 5/2006 | Horiguchi et al. ........... 713/172 |
| 7,119,662 B1 * | 10/2006 | Horiguchi et al. ........... 340/5.7 |
| 7,130,234 B2 | 10/2006 | Shionoiri et al. |
| 7,159,241 B1 * | 1/2007 | Horiguchi et al. ............. 726/10 |
| 7,180,093 B2 | 2/2007 | Takayama et al. |
| 7,232,065 B2 | 6/2007 | Al Amri |
| 7,335,573 B2 | 2/2008 | Takayama et al. |
| 2003/0024635 A1 | 2/2003 | Utsunomiya |
| 2003/0032210 A1 | 2/2003 | Takayama et al. |
| 2003/0061621 A1 * | 3/2003 | Lee et al. ............... 194/206 |
| 2003/0083203 A1 | 5/2003 | Hashimoto et al. |
| 2003/0134488 A1 | 7/2003 | Yamazaki et al. |
| 2004/0128246 A1 | 7/2004 | Takayama et al. |
| 2004/0129450 A1 | 7/2004 | Yamazaki et al. |
| 2004/0164302 A1 | 8/2004 | Arai et al. |
| 2004/0245519 A1 | 12/2004 | Van De Walle et al. |
| 2004/0245525 A1 | 12/2004 | Yamazaki et al. |
| 2005/0045729 A1 | 3/2005 | Yamazaki |
| 2005/0051870 A1 | 3/2005 | Yamazaki et al. |
| 2005/0130389 A1 | 6/2005 | Yamazaki et al. |
| 2005/0133790 A1 | 6/2005 | Kato |
| 2005/0134463 A1 | 6/2005 | Yamazaki |
| 2005/0135181 A1 | 6/2005 | Shionoiri et al. |
| 2005/0148121 A1 | 7/2005 | Yamazaki et al. |
| 2006/0163710 A1 | 7/2006 | Kuwabara et al. |
| 2007/0159335 A1 | 7/2007 | Arai et al. |
| 2008/0049437 A1 | 2/2008 | Takayama et al. |

FOREIGN PATENT DOCUMENTS

| | | |
|---|---|---|
| CN | 1275840 | 12/2000 |
| CN | 1430192 | 7/2003 |
| EP | 1 456 809 | 5/2006 |
| EP | 1 693 786 | 8/2006 |
| JP | 07-130652 | 5/1995 |
| JP | 08-272924 | 10/1996 |
| JP | 2000-299440 | 10/2000 |
| JP | 2002-319006 | 10/2002 |
| WO | WO-1999/030432 | 6/1999 |
| WO | WO 2003/009080 | 1/2003 |
| WO | WO 2003/030094 | 4/2003 |
| WO | WO-2005/057658 | 6/2005 |

OTHER PUBLICATIONS

Nikkei Electronics, *Sesame-Grain Sized Chips as Source*, Feb. 25, 2002, pp. 109-137.

Nikkei Electronics, *Sense of Crisis is a Trigger. Ignited Evolution of a Sesame-Grain Sized Chip*, Nov. 18, 2002, pp. 67-76.

Lee.B et al., "9.4 A CPU on a Glass Substrate Using CG-Silicon TFTS,", ISSCC 03 (Digest of Technical Papers. IEEE International Solid-State Circuits Conference), Feb. 11, 2003, pp. 164-165.

Takayama. T et al., "A CPU on a Plastic Film Substrate,", 2004 Symposium on VLSI Technology: Digest of Technical Papers, Jun. 15, 2004, pp. 230-231, The IEEE Electron Devices Society / The Japan Society of Applied Physics.

Ikeda. T et al., "21.2: Full-Functional System Liquid Crystal Display Using CG-Silicon Technology,", SID Digest '04 : SID International Symposium Digest of Technical Papers, 2004, pp. 860-863.

Usami.M et al., "Powder LSI:An Ultra Small RF Identification Chip for Individual Recognition Applications" ISSCC 03 (Digest of Technical Papers. IEEE International Solid-State Circuits Conference), Paper 22.7, 3 Pages, 2003.

* cited by examiner

801

801  802  803

804

1102  1101  1103

PACKING MATERIAL, TAG, CERTIFICATE, PAPER MONEY, AND SECURITIES

BACKGROUND OF THE INVENTION

1. Field of the Invention

The present invention relates to a packing material, a tag, a certificate, paper money, and securities, each of which has a semiconductor device capable of wireless transmissions provided to a support medium (also referred to as a base material).

2. Related Art

A semiconductor device as typified by a wireless tag capable of transmitting and receiving data wirelessly such as identification information has been put to the practical use in various fields. The semiconductor device has been expected to expand a market as a new type information communication terminal. The wireless tag is also referred to as a RFID (Radio Frequency Identification) tag, or an IC tag. Most wireless tags that had been put to the practical use have an antenna and an integrated circuit (IC chip) formed by using a semiconductor substrate.

A wireless tag has advantages that there is no possibility that stored data is read by a physical method contrary to a magnetic card or a bar code, the data of which can be read wirelessly; and the stored data is difficult to be falsified. Further, contrary to a magnetic card or a bar code, the wireless tag has a merit that it is difficult to be forged since the manufacture of the wireless tag requires a comparative large productive facilities.

However, as the technique of counterfeit of the wireless tag is improved, it becomes difficult to prevent or detect counterfeit or deception by using simply a wireless tag.

In principle, a wireless tag can be formed to be smaller than a magnetic card, a bar code, or the like. Accordingly, it is expected to enlarge the range of usage of a wireless tag. It may be envisioned that a wireless tag is attached to a flexile material such as paper or plastic depending on its usage. However, a semiconductor substrate has a stronger mechanical strength than those of the foregoing materials. Therefore, if a wireless tag is provided to a packing material, a tag, a certificate, paper money, securities, and the like, each of which uses a flexible material as a support medium, there is possibility of breaking the wireless tag in use. Hence, it can be said that the wireless tag in this instance lacks in practicality.

The mechanical strength of a wireless tag can be improved to some extent by reducing its own area. However, in this instance, it becomes difficult to secure a circuit size or the gain of an antenna. Especially, it is unfavorable that the gain of an antenna is lowered since it leads to shorten a communications distance and restrict the usage of the wireless tag. Accordingly, the wireless tag area cannot be reduced blindly if importance is placed on the gain of an antenna. The limitations of improving a mechanical strength become arisen.

In case of an IC chip formed by using a semiconductor substrate, the semiconductor substrate serves as a conductor to shield an electric wave. Accordingly, there arises a problem that a signal tends to be attenuated depending on the direction of the signal being sent.

SUMMARY OF THE INVENTION

In view of the foregoing, it is an object of the present invention to provide a packing material, a tag, a certificate, paper money, and securities, each of which can be surely prevented from counterfeit or deception. It is more specific object of the present invention to provide a packing material, a tag, a certificate, paper money, and securities, each of which uses a wireless tag that can reduce costs, improve a mechanical strength, and prevent an electric wave from shielding.

According to the present invention, a plurality of wireless tags is used for an object such as a packing material, a tag, a certificate, paper money, securities, or the like. The wireless tag (also referred to as a wireless chip or a semiconductor device) comprises an antenna and an integrated circuit electrically connected to the antenna. By means of the antenna, signals can be transmitted and received between a reader/writer and an integrated circuit, and power supply voltage can be supplied from the reader/writer to the integrated circuit. The locations of the plurality of wireless tags are varied on the object basis such that the objects can be identified. The object using a wireless tag is identified by reading the location of the plurality of wireless tags attached to each objects.

According to the present invention, by making use of its weakness of the difficulty of antenna gain by reducing the area of a wireless tag to place importance on a mechanical strength, the accuracy of the location of a detected wireless tag and the irrefragability of preventing or detecting counterfeit and deception can be improved. Further, the more random the locations of the wireless tags, the more certain it becomes to identify objects and to prevent or detect the counterfeit and the deception of the objects.

A packing material, a tag, a certificate, paper money, and securities use a flexible support medium such as plastic or paper. A wireless tag is pasted onto the surface of the support medium, or embedded in the support medium.

A packing material according to the present invention corresponds to a support medium capable of being molded or a molded support medium for wrapping an object, for example, a wrap, a plastic bottle, a tray, or a capsule. A tag according to the present invention corresponds to a tag such as a luggage tag, a price tag, or a name tag having information of the object attached with the tag. A certificate according to the present invention corresponds to a document for certificating facts such as a family register, a residency card, a passport, a driver's license, an identification card, a membership card, a credit card, a cash card, a prepaid card, a consultation card, or a commuter ticket. Securities according to the present invention correspond to securities for showing private property right such as a bill, a check, a carriage note, a shipping cargo warrant, a bond warrant, a stock certificate, a bond certificate, a merchandise coupon, or a mortgage certificate.

Providing a memory such as a ROM in which data cannot be rewritten can further prevent the counterfeit of a packing material, a tag, a certificate, paper money, and securities. Further, data stored in the memory can be varied intentionally in some wireless tags among the plurality of wireless tags. According to the foregoing structure, the object can be surely identified and the irrefragability of preventing and detecting counterfeit or deception can be improved by using the data stored in each wireless tag besides data on the location of the wireless tag.

According to the present invention, a wireless tag may be formed by using a transistor formed over a single crystalline semiconductor substrate, alternatively, the wireless tag may be formed by using an integrated circuit (hereinafter, thin film integrated circuit) formed by a TFT having a dielectric isolated thin semiconductor film. The use of the dielectric isolated TFT to form the wireless tag makes it difficult to produce a parasitic diode between the tag and a substrate contrary to the transistor formed over a semiconductor film. A large amount of current is not flowed into a drain region by the electric potential of an alternating signal given to a source region or the drain region. Accordingly, the wireless tag can be prevented from being deteriorated or broken.

A wireless tag using a thin film integrated circuit is low cost and small, and so it is suitable for use in a disposable product. Especially, the packing material having a low cost and small wireless tag according to the present invention is very useful in wrapping a product with which the sales are greatly influenced by the difference of a price of several yen or several ten yen. In addition, the wireless tag using a thin film integrated circuit is useful for foods with which the commercial value is greatly influenced by a production area or a producer in order to prevent the deception of the production area or the producer at low cost. It becomes that a wholesaler, a retailer, a consumer, and the like know readily a production area, a producer, the date of manufacture, a production method, and the like by using the packing material according to the present invention to record the process at a production stage of the product.

An antenna may be provided along with a thin film integrated circuit, and pasted onto a flexible support medium along with the thin film integrated circuit. Alternatively, the antenna may be provided independently of the thin film integrated circuit, and pasted onto the flexible support medium along the thin film integrated circuit. Further alternatively, the antenna may be preliminarily provided to the flexible support medium, and the thin film integrated circuit may be pasted onto the flexible support medium or an object so as to be electrically connected to the antenna.

As a method for pasting the thin film integrated circuit, various methods such as a method that a metal oxide film is provided between a substrate having high heat resistance and the thin film integrated circuit, and the metal oxide film is made be fragile to separate the thin film integrated circuit; a method that an amorphous silicon film containing hydrogen is provided between the substrate having high heat resistance and the thin film integrated circuit, and the amorphous silicon film is removed by laser irradiation or etching treatment to separate the thin film integrated circuit from the substrate; or a method that the substrate having high heat resistance provided with the thin film integrated circuit is removed mechanically or removed by etching with solution or gas to separate the thin film integrated circuit from the substrate can be adopted.

Individually manufactured thin film integrated circuits may be pasted to each other to be stacked in order to increase a circuit size or an amount of memory. The mechanical strength of a wireless tag can be maintained on some level even if a plurality of thin film integrated circuits is stacked since the thin film integrated circuit is substantially thinner than an IC chip manufactured by a semiconductor substrate. The stacked thin film integrated circuits may be connected by a known connection method such as a flip chip method, a TAB (Tape Automated Bonding) method, or a wire bonding method.

The irrefragability of preventing and detecting counterfeit or deception of objects such as a packing material, a tag, a certificate, paper money, and securities can be improved by using a plurality of wireless tags for the foregoing objects. By making use of its weakness of the difficulty of antenna gain by reducing the area of a wireless tag to place importance on a mechanical strength, the accuracy of the location of a detected wireless tag can be improved. Further, the more random the locations of the wireless tags, the more certain it becomes to identify the objects and to prevent or detect the counterfeit and the deception of the objects.

With respect to a packing material, a tag, a certificate, paper money, and securities according to the present invention, the use of a thin film integrated circuit for a wireless tag makes it difficult to produce a parasitic diode between the tag and a substrate contrary to a transistor formed over a semiconductor film. A large amount of current is not flowed into a drain region by the electric potential of an alternating signal given to a source region or the drain region. Accordingly, the wireless tag can be prevented from being deteriorated or broken. Further with respect to a packing material, a tag, a certificate, paper money, and securities according to the present invention, the use of a thin film integrated circuit for a wireless tag can prevent signals from attenuating due to the shielding of an electronic wave.

The frequencies of an electronic wave of 13.56 MHz and 2.45 GHz are often used generally for a wireless tag. It is extremely important that a wireless tag is formed so as to detect the electronic wave of the frequencies in improving the versatility.

By using a thin film integrated circuit for a wireless tag, the costs for a packing material, a tag, a certificate, paper money, and securities can be drastically reduced. For example, the case of using a silicon substrate of 12 inches in diameter and the case of using a glass substrate of 73×92 $cm^2$ are compared with each other. The area of the silicon substrate is approximately 73000 $mm^2$ whereas the area of the glass substrate is approximately 672000 $mm^2$. The glass substrate is approximately 9.2 times as large as the silicon substrate. The glass substrate of 672000 $mm^2$ can produce 672000 pieces of wireless tags of 1 $mm^2$ in case of ignoring the area consumed due to the division of the substrate. The number of the wireless tags is approximately 9.2 times as many as that of the silicon substrate. The wireless tag using the glass substrate of 73×92 $cm^2$ can be mass produced with one-third less capital investment since the wireless tag using the glass substrate requires the less number of processes than that using the silicon substrate of 12 inches in diameter. In case of using the thin film integrated circuit peeled from the grass substrate, the grass substrate can be reused. Even when based on the costs for compensating a broken glass substrate or cleaning the surface of a glass substrate, the costs can be drastically reduced compared to the case of using the silicon substrate. The price of the glass substrate of 73×92 $cm^2$ is approximately half as that of the silicon substrate of 12 inches in diameter.

Therefore, the price of a wireless tag using the glass substrate of 73×92 $cm^2$ can be reduced approximately to one-thirty compared with the wireless tag using the silicon substrate of 12 inches in diameter. Since a wireless tag is expected to be used for a disposable product, a packing material, a tag, a certificate, paper money, and securities according to the present invention are extremely useful.

These and other objects, features and advantages of the present invention will become more apparent upon reading of the following detailed description along with the accompanied drawings.

DESCRIPTION OF THE INVENTION

Then, structures of a packing material, a tag, a certificate, paper money, and securities are explained. The packing material, the tag, the certificate, the paper money, and the securities have a plurality of wireless tags. The wireless tags are embedded in a flexible support medium or formed over the surface of the flexible support medium such as paper or plastic. The locations of the wireless tags are varied individually such that the foregoing objects can be identified.

Figure 9A:
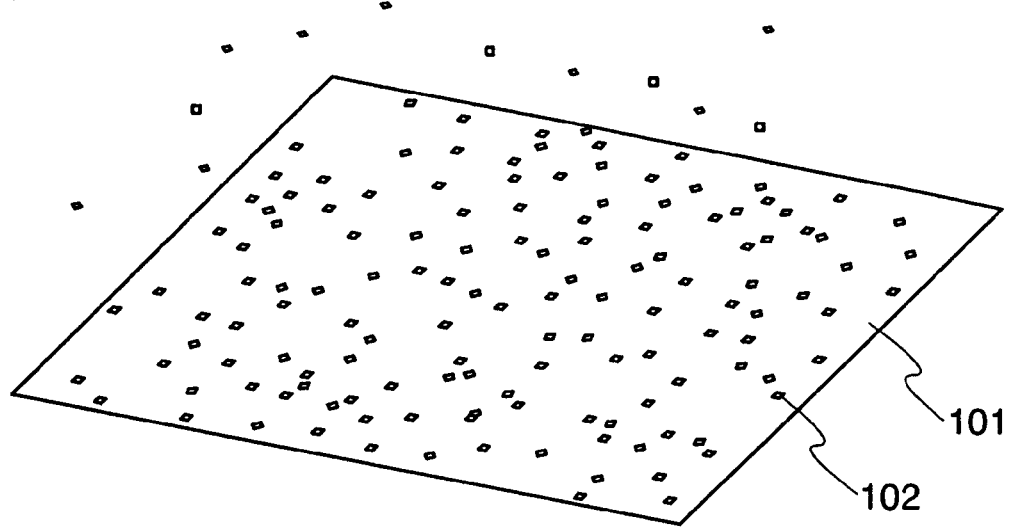
FIGS. 9A and 9B are views for showing a method for manufacturing a packing material, a tag, a certificate, paper money, and securities.

FIG. 9A shows the state that a plurality of wireless tags 102 is dispersed over a support medium 101. The location of the wireless tags 102 may have regularity. Alternatively, the wireless tags may be dispersed in such a way that the wireless tags have no regularity. Accordingly, identification can be possible even if the number of individual is large. Further alternatively, the wireless tags 102 may be covered by a support medium that is prepared separately so as not to be exposed after dispersing the wireless tags 102 over the support medium 101.

In case that an IC chip formed over a single crystalline substrate is used as a wireless tag, the wireless tag is preferably arranged in the direction such that an electric wave is further readily received by an antenna. On the other hand, in case that a thin film integrated circuit is used as a wireless tag, electric waves from various directions can be comparatively readily received since a semiconductor substrate that attenuates an electric wave is not used in the wireless tag. Therefore, the restriction on dispersing the wireless tags over the support medium 101 can be further diminished in case of the wireless tag using a thin film integrated circuit compared to the wireless tag using an IC chip.

Figure 9B:
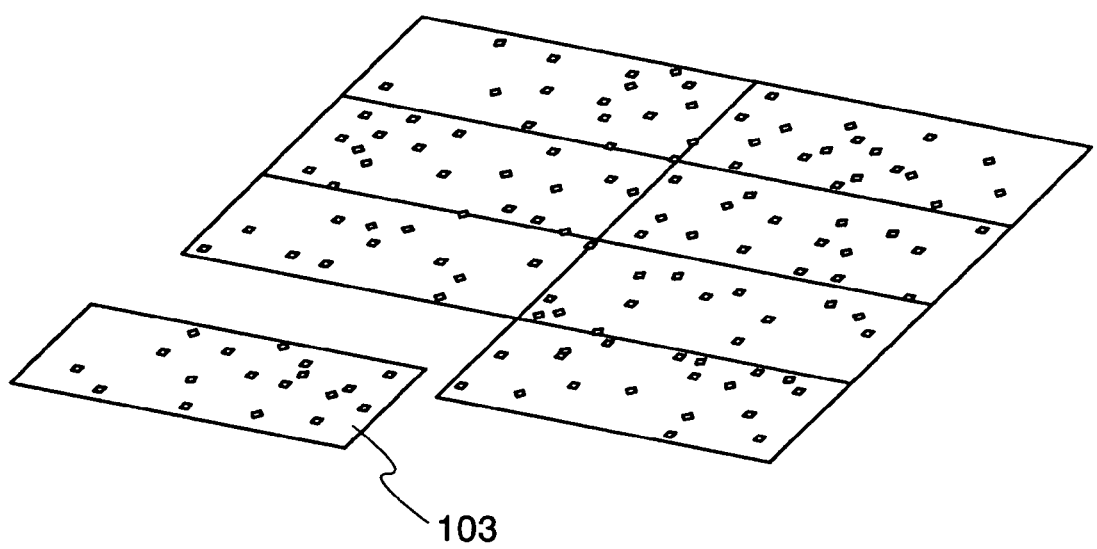

In case that a plurality of support media for forming a packing material, a tag, a certificate, paper money, and securities is formed from one support medium, a plurality of wireless tags is provided to the plurality of each support media. FIG. 9B shows the state that the support medium 101 is divided into a plurality of support media 103. In case that a plurality of support media is formed by one support medium as shown in FIG. 9B, it should be noted that wireless tags are dispersed into the original support medium, so that a plurality of wireless tags is formed to each of the support media 103 in dividing the support medium 101.

Even if the wireless tags are broken in dividing the support medium 101 due to the wireless tags are crossed over the boundaries for dividing, the other wireless tags may cover the broken wireless tags to be identified.

Figure 10:
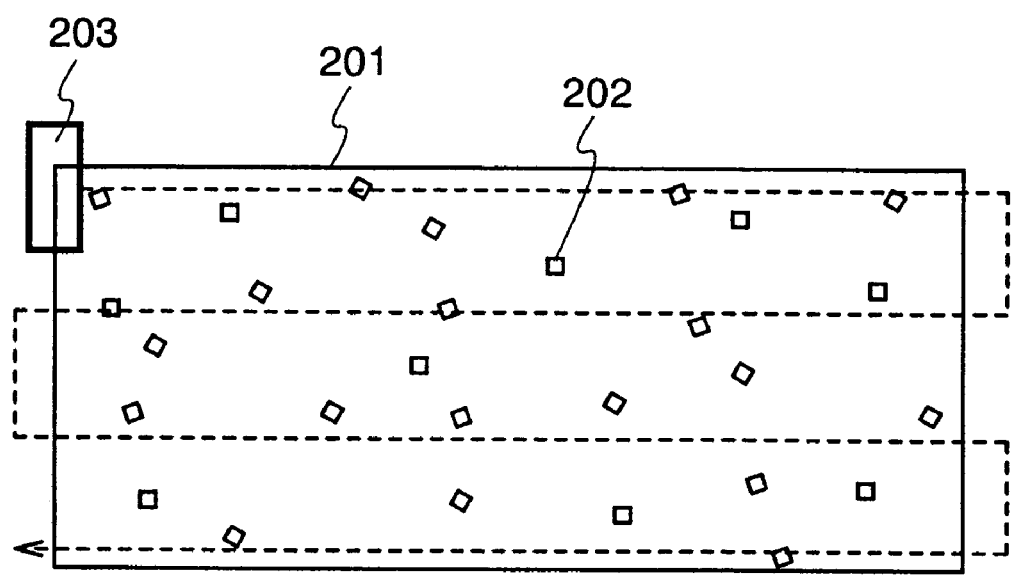
FIG. 10 is a view for showing a method for reading of the location of a wireless tag.

FIG. 10 shows a support medium 201 used for a packing material, a tag, a certificate, paper money, and securities; a wireless tag 202 dispersed over the support medium 201; and an area 203 that can read data from the wireless tag 202 by a reader/writer. A plurality of each wireless tag 202 provided to the support medium has an antenna, an IC chip, or a thin film integrated circuit. Therefore, the location of each the wireless tag at the support medium can be read as information.

Specifically, the information of location of each of the wireless tag can be read by scanning the area 203 over the support medium 201, and by receiving data from the plurality of each the wireless tag 202 in the exploring process. FIG. 10 shows the state that area 203 scans the support medium 201 in the direction indicated by dotted arrow. Alternatively, the area 203 may scan the support medium 201 by moving the support medium 201. Further alternatively, the area 203 may scan the support medium 201 by fixing the support medium 201. Furthermore alternatively, the area 203 may scan the support medium 201 by both moving and fixing the support medium 201.

The information of location is read by scanning the area 203 that can read data from the wireless tag 202 using the reader/writer in FIG. 10. However, the present invention is not limited thereto. For example, the information of location may be read by obtaining the distance between the reader/writer and the antenna from strong and weak of a signal including the data in reading the data from the plurality of each wireless tags 202. In this instance, it is preferably to improve the reader/writer in sensitivity to enlarge the area 203 in order to fit the whole support medium 201 in the area 203.

Alternatively, identification may be carried out by mixing wireless tags storing different data to use the contents of the data stored in the wireless tag in addition to the information of location of the plurality of each wireless tags 202.

As the data stored in the plurality of each wireless tags, data stored in a memory that is not rewritable such as a ROM, or data stored in a rewritable memory may be used. Despite the data stored in a rewritable memory, password may be required to rewrite the data; a private key may be provided; or the memory may be doctored. In case of storing data in a rewritable memory, the data may be written either after dispersing or before dispersing the plurality of each the wireless tags.

Figure 2:
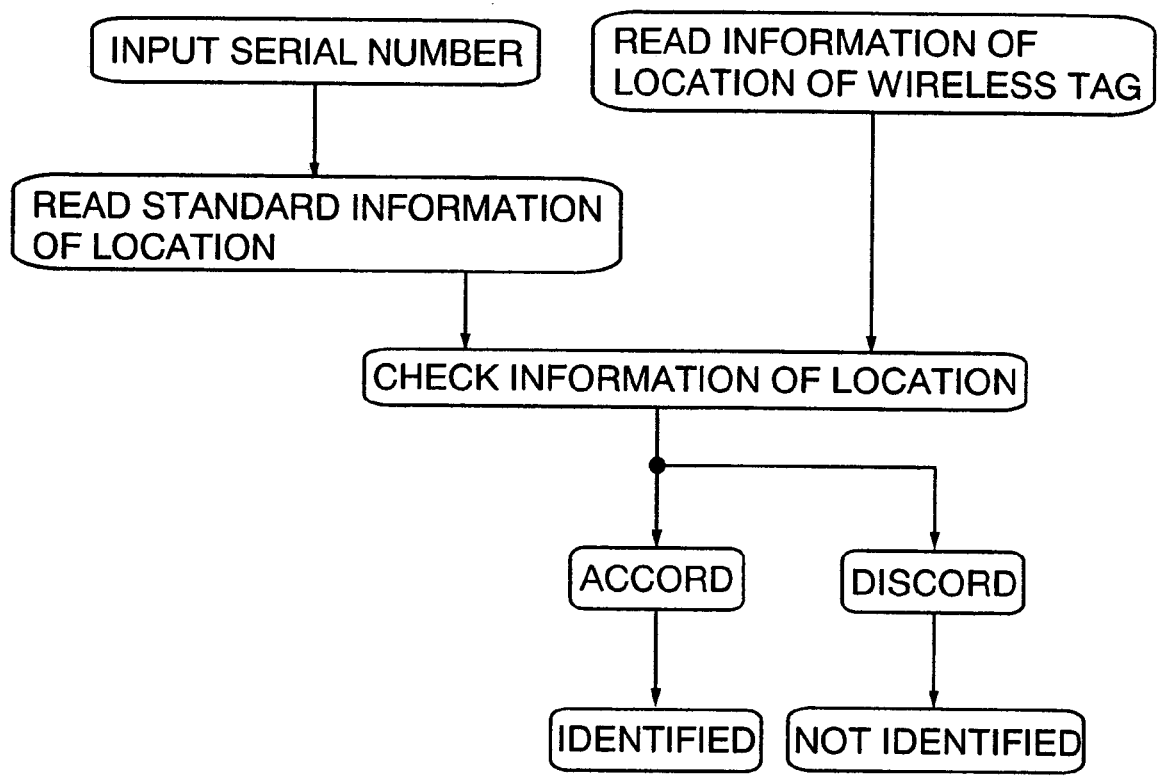
FIG. 2 is a flow chart for showing a procedure of identifying.

The procedure of identification by a reader/writer is explained hereinafter. FIG. 2 is a flow chart for showing the procedure of identification by utilizing the information of location of a wireless tag provided to a support medium and a serial number attached to the support medium.

As shown in FIG. 2, a serial number for reading the standard information of location attached to each the support medium is inputted to a reader/writer. In FIG. 2, a serial number is used. Alternatively, the serial number is not required to be used in case that the standard information of location corresponding to the support medium can be identified. Then, the standard information of location corresponding to the support medium is read by using the serial number. The standard information of location may be stored in the reader/writer or in a server that is separately prepared.

Further, the reader/writer reads the information of location of the plurality of wireless tags formed over the support medium. Then, the standard information of location is checked against the information of location of the plurality of wireless tags that is actually read. In case that the two pieces of information of location are accorded with each other, a packing material, a tag, a certificate, paper money, and securities are identified. On the other hand, in case that the two pieces of information of location are not accorded with each other, a packing material, a tag, a certificate, paper money, and securities are not identified. As a result, counterfeit or deception is suspected.

Figure 3:
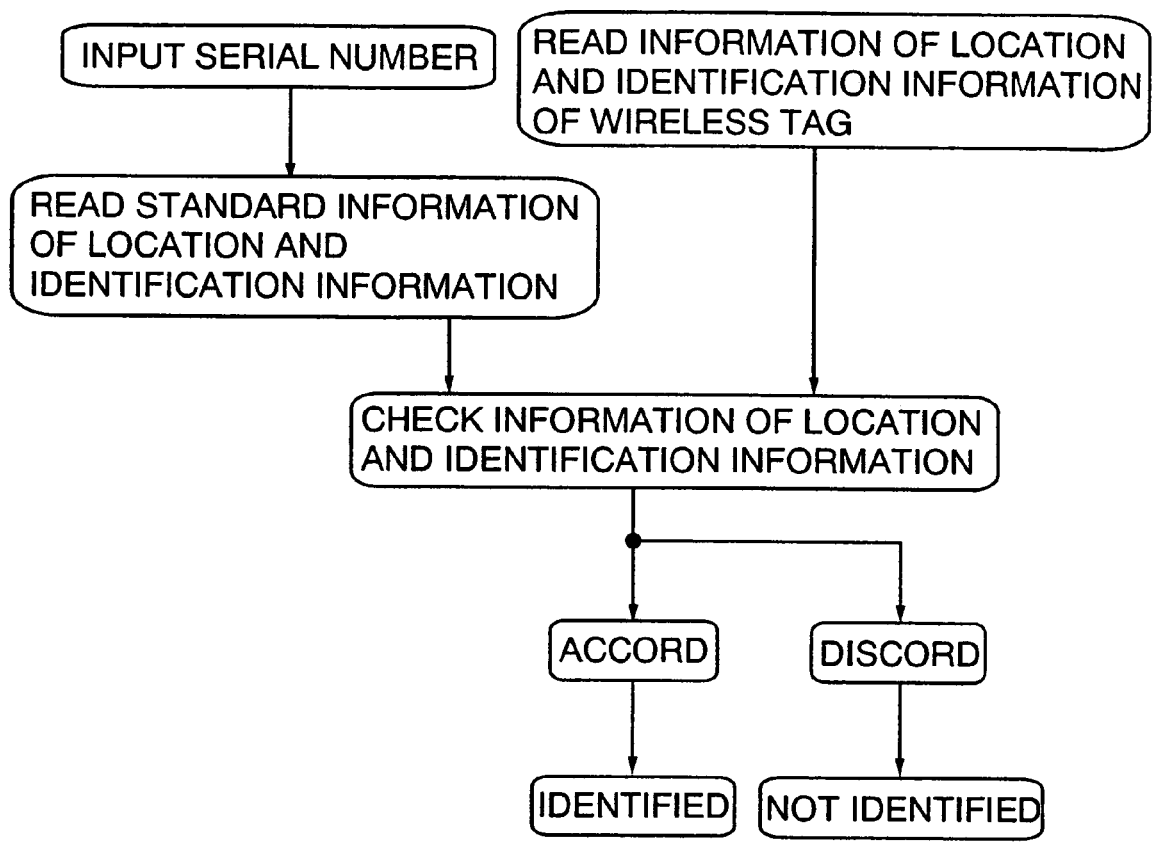
FIG. 3 is a flow chart for showing a procedure of identifying.

According to the present invention, data read from the wireless tag can be used to identify an object in addition to the information of location of the wireless tag. FIG. 3 is a flow chart for showing the procedure of identification by using information of location of a wireless tag formed to a support medium, data read from the wireless tag, and a serial number attached to the support medium.

In FIG. 3, the standard information of location corresponding to the support medium and the standard data that may be included in the wireless tag are read by using a serial number. Further, the reader/writer reads the information of location of the plurality of wireless tags formed over the support medium and the data stored in the plurality of wireless tags. An object can be identified by checking the two pieces of the information of location and the two data against each other.

As shown in FIG. 3, the object can be surely identified and the irrefragability of preventing and detecting counterfeit or deception can be improved by using the data read from the wireless tag besides the information of location of the wireless tag to identify an object.

Figure 11:
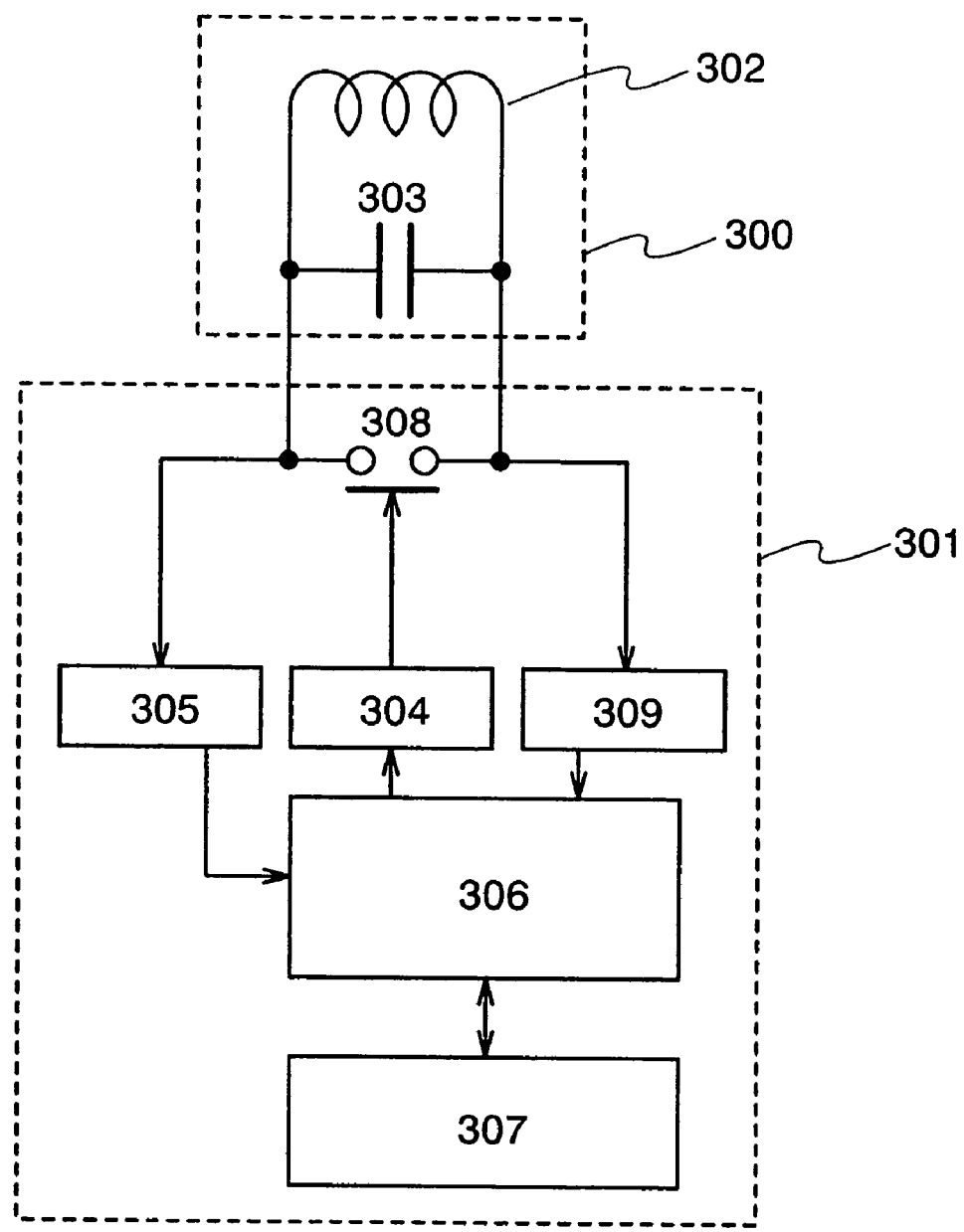
FIG. 11 is a view for showing a structure of a wireless tag.

One mode of a functional structure of a wireless tag used in the present invention is explained with reference to FIG. 11. In FIG. 11, reference numeral 300 denotes an antenna, and 301 denotes a thin film integrated circuit or an IC chip. The antenna 300 comprises an antenna coil 302 and a capacitor element 303 formed within the antenna coil 302. The thin film integrated circuit or the IC chip 301 comprises a demodulation circuit 309, a modulation circuit 304, a rectification circuit 305, a microprocessor 306, a memory 307, and a switch 308 for providing load modulation to the antenna 300. In addition, the number of the memory 307 is not limited to one; a plurality of the memories 307 may be provided. As the memory 307, an SRAM, a flash memory, a ROM, an FRAM (registered mark), or the like may be used.

A signal sent from the reader/writer as electric wave is converted into an alternating electric signal by electromagnetic induction in the antenna coil 302. The alternating electric signal is demodulated in the demodulation circuit 309 to be sent to the microprocessor 306 at the subsequent stage. Power supply voltage is produced by using an alternating electric signal in the rectification circuit 305 to be supplied to the microprocessor 306 at the subsequent stage.

Arithmetic processing is carried out according to the inputted signal in the microprocessor 306. The memory 307 stores a program or data used in the microprocessor 306, and can be used as a work place for the arithmetic processing. The signal sent from the microprocessor 306 to the modulation circuit 304 is modulated into an alternating electric signal. The switch 308 can add load modulation to the antenna coil 302 according to the alternating electric signal from the modulation circuit 304. The reader/writer can read eventually the signal from the microprocessor 306 by receiving the load modulation added to the antenna coil 302 as an electric wave.

The wireless tag shown in FIG. 11 is illustrative only as one mode according to the present invention. The present invention is not limited thereto. A method for transmitting a signal is not limited to an electromagnetic coupling type; an electromagnetic induction type, a microwave type, or the other transmitting types may be used.

Figure 12:
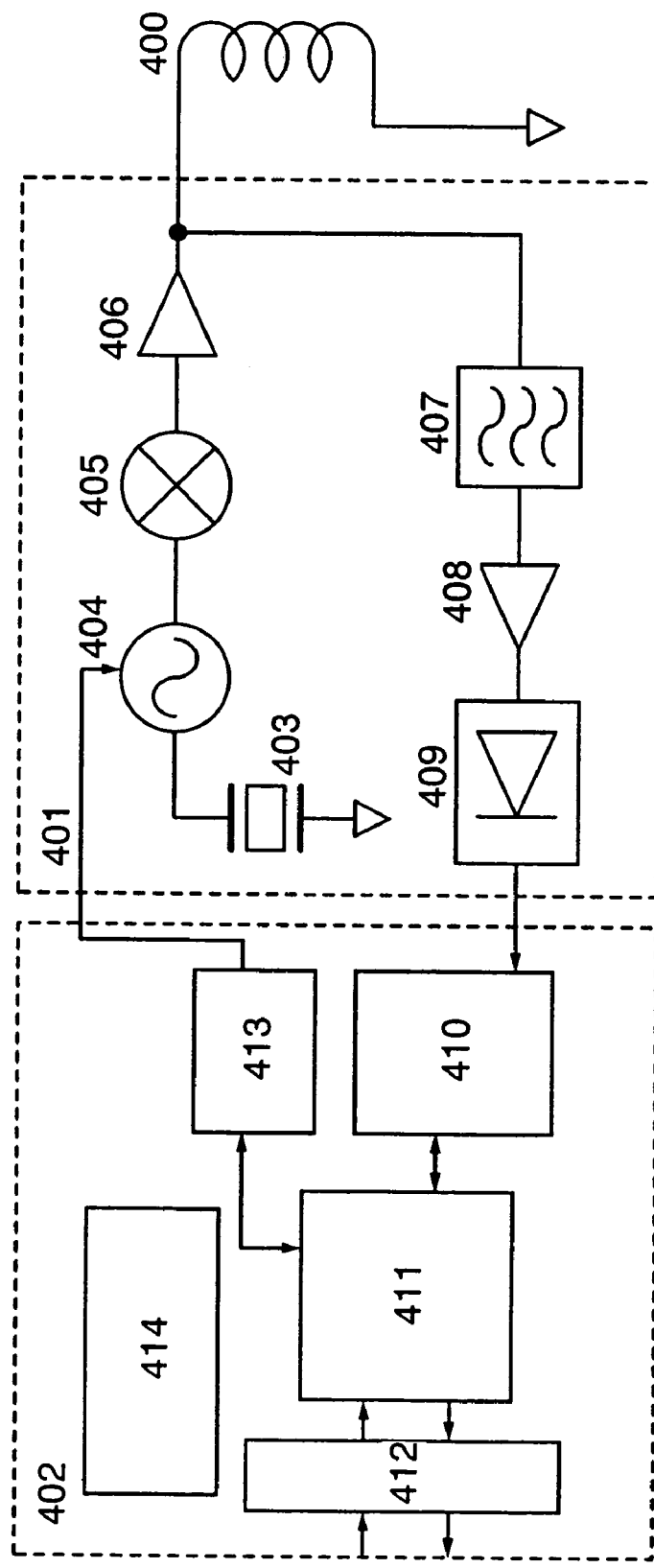
FIG. 12 is a view for showing a structure of a reader/writer.

One mode of a functional structure of a reader/writer used in the present invention is explained with reference to FIG. 12. In FIG. 12, reference numeral 400 denotes an antenna coil; 401, an electric wave interface unit; and 402, a control unit.

In the electric wave interface unit 401, the frequency of an alternating electric signal generated in a radiator 403 can be converted into a particular frequency in a signal source 404 to be sent to a modulation circuit 405. Then, the signal converted into the particular frequency is modulated in the modulation circuit 405 according to a signal inputted to the electric wave interface unit 401 from the control unit 402, and then, the modulated signal is amplified in the amplification circuit 406 to be inputted to the antenna coil 400.

In the electric wave interface unit 401, an electric wave sent from a wireless tag is converted into an alternating electric signal in the antenna coil 400, and noise is cut in a filter 407, then, the electric signal is amplified in an amplification circuit 408 to be sent to a demodulation circuit 409. In the demodulation circuit 409, the electric signal from the amplification circuit 408 is demodulated to produce a direct current electric signal. The direct current electric signal is sent to the control unit 402.

In the control unit 402, the sending of a signal to the modulation circuit 405 and the receiving of a signal from the modulation circuit 409 are controlled in the controlling circuit 410. A microprocessor 411 carries out various kinds of arithmetic processing according to a signal from the controlling circuit 410, a signal inputted via an interface 412 from an upper machine than a reader/writer, or the like to send generated various signals to the control circuit 410 and the interface 412. The memory 413 stores a program or data used in the microprocessor 411, and can be used as a work place for the arithmetic processing. A power source unit 414 provides a power source to the control unit 402 and the electric wave interface unit 401.

The information of location is checked by arithmetic processing in the microprocessor 411, and a signal including the checking result as data can be sent to the upper machine as a signal.

A reader/writer shown in FIG. 12 is illustrative only as one mode of the present invention. The present invention is not limited to the foregoing structure.

Embodiment 1

According to the present invention, a distribution process of products can be recorded in case of using a nonvolatile memory in a wireless tag. The record of the process in a production stage makes it possible that a wholesaler, a retailer awareness of, and a consumer know readily the production area, a producer, a date of manufacture, a processing method, and the like. Moreover, deception can be prevented.

Figure 4A:
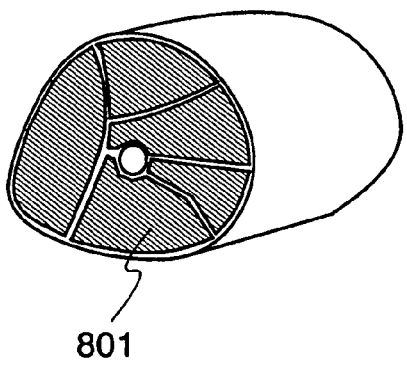
FIGS. 4A to 4D are views for showing a method for identifying a processing area of foods.
Figure 4B:
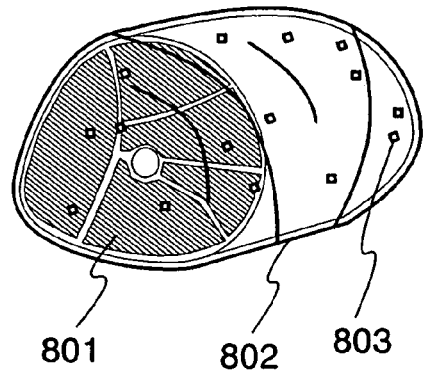

In this embodiment, a method for identifying the processing area of foods by using a packing material according to the present invention is explained. FIG. 4A shows a food that is processed at a processing area (meat 801 is exemplified here). FIG. 4B shows the state that the meat 801 is wrapped in a packing material 802. In this embodiment, an example in which a film such as a wrap having a thickness of several ten μm containing resin is used as a support medium of the packing material 802 is explained.

Figure 5:
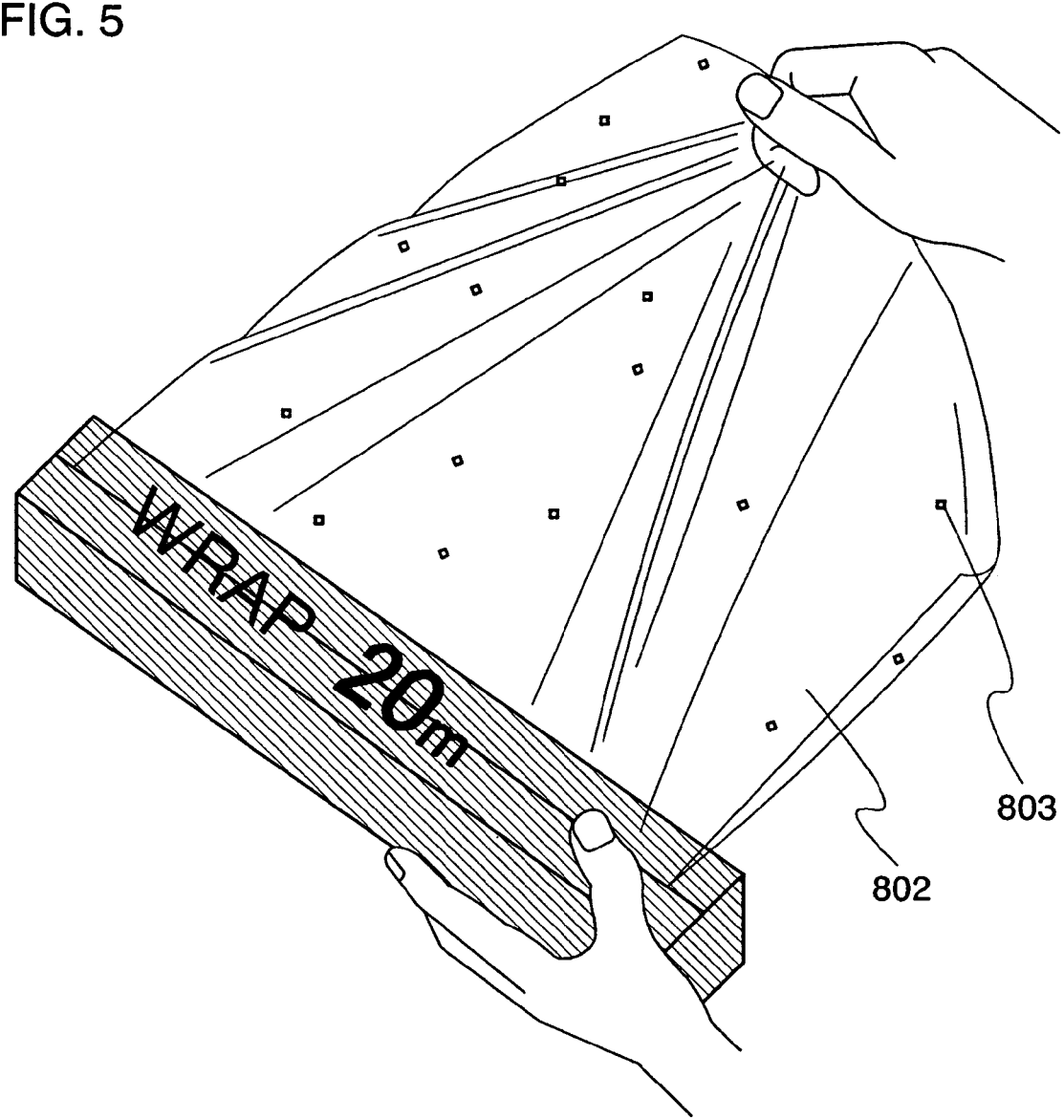
FIG. 5 is an external view of a packing material according to the invention using a wrap as a support medium.

FIG. 5 shows an external view for showing the packing material 802 according to the present invention using a wrap as a support medium. The packing material 802 is provided with wireless tags 803 over its surface or its inside. The wireless tags 803 are dispersed in the packing material 802 such that the wrapped object can be identified. Accordingly, it becomes possible to form the state that the wireless tags 803 are dispersed at the periphery of the meat 801 by wrapping the meat 801 by using the packing material 802. The location of the wireless tags 803 dispersed at the periphery of the meat 801 may be surely varied on the meat 801 basis by varying the way of wrapping the meat 801 on the meat 801 basis.

Figure 4C:
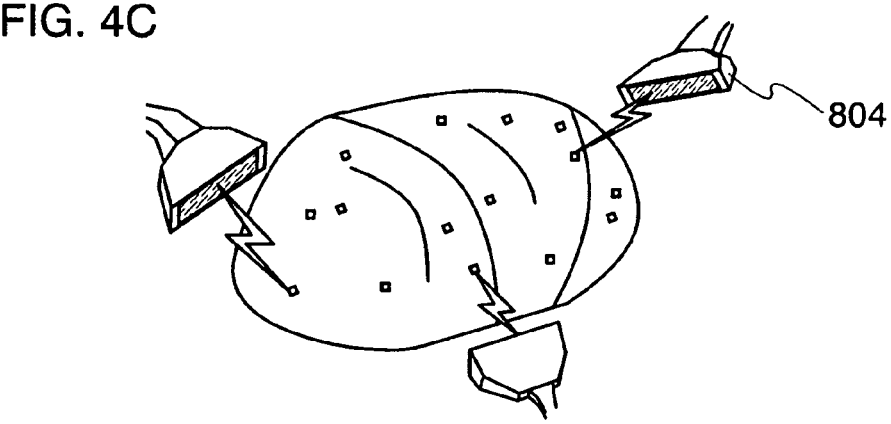

FIG. 4C shows the state that information of location of the wireless tags 803 dispersed at the periphery of the meat 801 is read by a reader/writer 804. Further, it is often the case that wireless tags 803 dispersed at the periphery of the meat 801 are not in one plane. In this instance, as shown in FIG. 4C, the information of location of the wireless tags 803 are read from a plurality of directions by a plurality of the reader/writer 804. Alternatively, the single reader/writer 804 may scan in a three-dimensional direction. Further alternatively, the single reader/writer 804 may be fixed, and the meat 801 may be turned over.

Figure 4D:
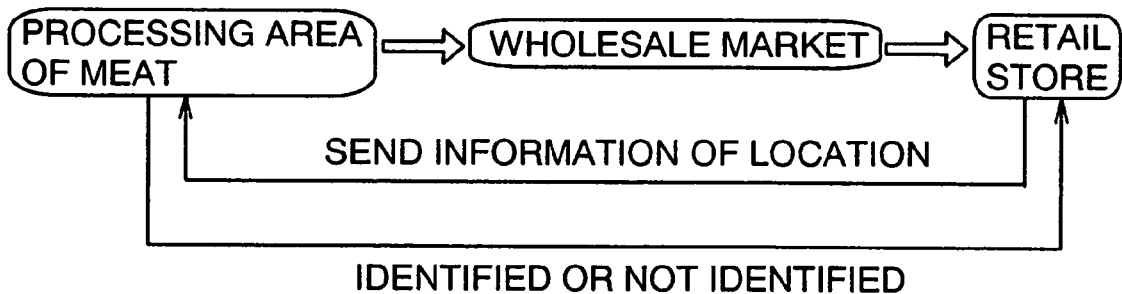

The information of location that is read is recorded at a processing area of the meat 801 with a particular number, code, and the like. When the meat 801 is actually put on a wholesale market and finally appeared in a retail store as shown in FIG. 4D, the information of location of the wireless tags 803 dispersed at the periphery of the meat 801 are read in the retail store. Then, the information of location that is recorded at the processing area of the meat is inquired based on the particular number, code, and the like attached to the meat 801. And then, the information of location read at the retail store is checked against the information of location recorded at the processing area of the meat. In case that the information of location is accorded with each other, the processing area of the meat 801 is verified. In case that the information of location is not accorded with each other, the processing area of the meat 801 is not verified.

A method for utilizing the packing material according to the present invention explained in this embodiment is illustrative only. The method for utilizing the packing material is not limited to the mode shown in FIG. 4, all other utilizing methods can be adopted.

Embodiment 2

According to the present invention, the counterfeit of a packing material, a tag, a certificate, paper money, and securities can be further surely prevented by providing a memory that does not allow data to be rewritten such as a ROM in a wireless tag.

Figure 1A:
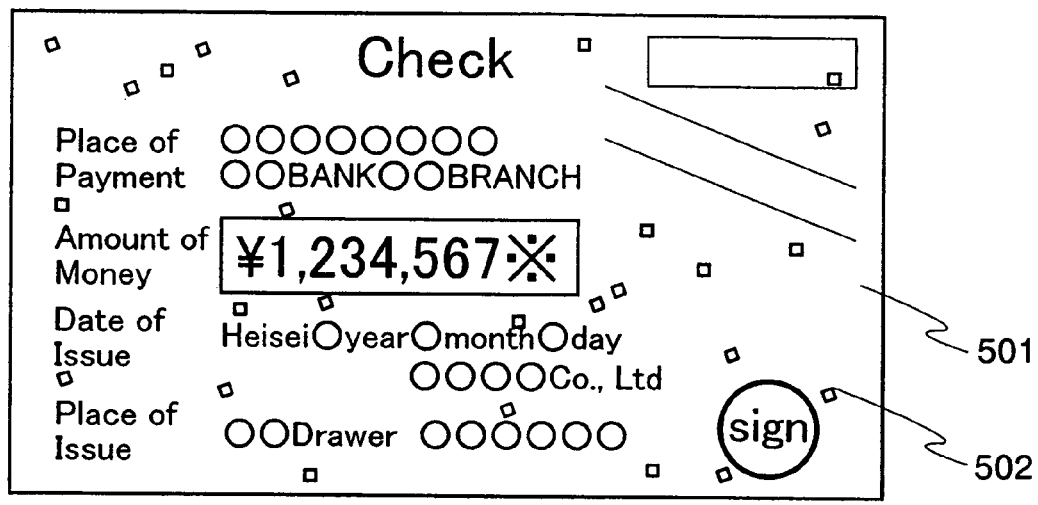
FIGS. 1A to 1C are views for showing an example of a packing material, a tag, a certificate, paper money, and securities.

FIG. 1A shows an example of a check 501 that corresponds to securities according to the present invention. FIG. 1A shows that a plurality of wireless tags 502 is formed to be dispersed within the check 501 such that the check 501 can be identified. The plurality of wireless tags 502 may be embedded in the check 501, or formed so as to be exposed on the surface of the check 501.

Figure 1B:
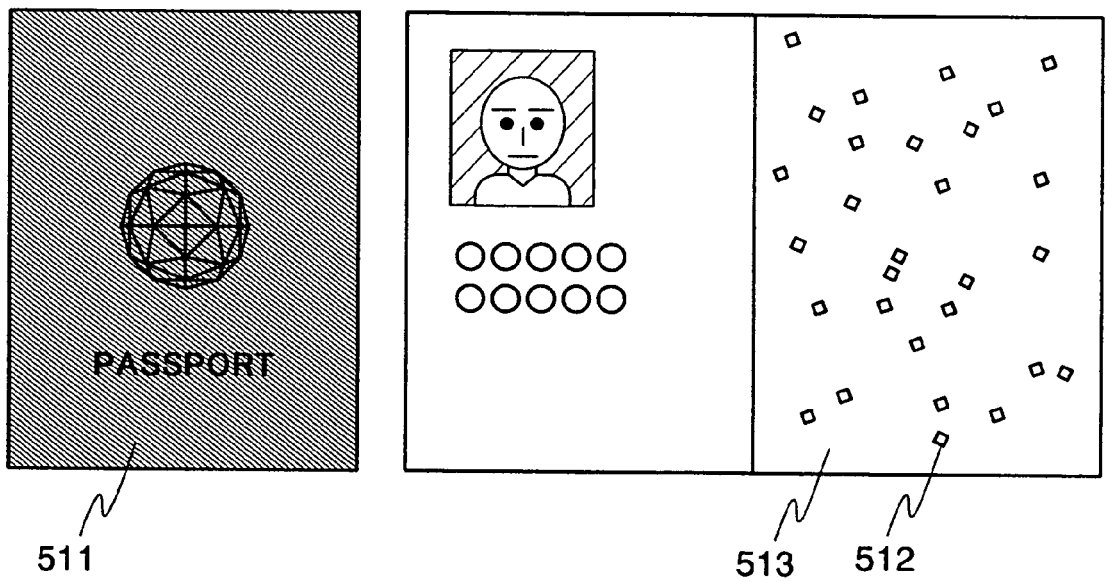

FIG. 1B shows an example of a passport 511 that corresponds to a certificate according to the present invention. FIG. 1B shows an example that an identification page 513 of the passport is provided, and a plurality of wireless tags 512 is embedded in the identification page 513. The plurality of wireless tags 512 is dispersed in the identification page 513 such that the passport 511 can be identified. The plurality of wireless tags 512 may be embedded in a support medium of the page 513, or formed so as to be exposed on the surface of the support medium of the page 513. In FIG. 1B, the identification page 513 is provided, alternatively, the wireless tags 512 may be provided over the surface of the passport 511.

Figure 1C:
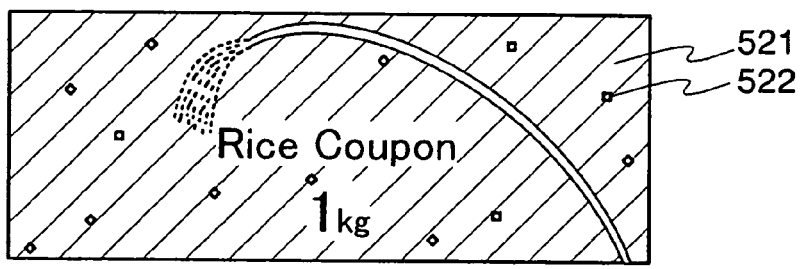

FIG. 1C shows an example of a merchandise coupon 521 that corresponds to securities according to the present invention. FIG. 1C shows that a plurality of wireless tags 522 is formed to be dispersed within the merchandise coupon 521 such that the merchandise coupon 521 can be identified. The plurality of wireless tags 522 may be embedded in the merchandise coupon 521, or formed so as to be exposed on the surface of the merchandise coupon 521.

Embodiment 3

A wireless tag using a thin film integrated circuit is low cost and small. Hence, a packing material, a tag, a certificate, paper money, or securities according to the present invention having the wireless tag using a thin film integrated circuit are suitable for use in disposable products. Especially, the packing material having a low cost and small wireless tag according to the present invention is very useful in wrapping a product with which sales are greatly influenced by the difference of a price of several yen or several ten yen.

Figure 8A:
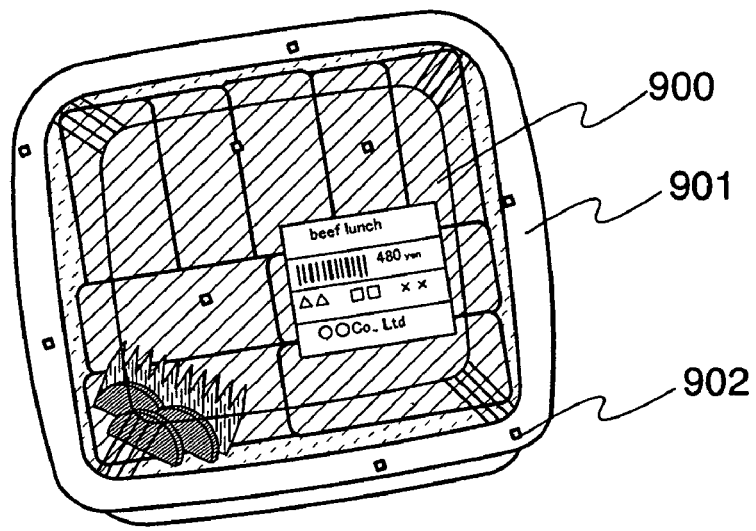
FIGS. 8A to 8C are explanatory views of a method for utilizing a packing material according to the present invention.

FIG. 8A shows a box lunch 900 for sales wrapped in a packing material 901 according to the present invention. As shown in FIG. 8A, the packing material 901 has a plurality of wireless tags 902, and the plurality of wireless tags 902 is dispersed at the periphery of the box lunch 900. By recording the price of a product within the wireless tag 902, the price of the box lunch 900 can be paid by a resister that has a function of a reader/writer. In case of using the packing material 901 according to the present invention, different from a resister using a bar code, the price can be read without pressing a reader of a bar code against a particular area since the wireless tags 902 are dispersed at the periphery of the box lunch 900. Therefore, the complication at payment of searching a reader area for a bar code can be eliminated.

Figure 8B:
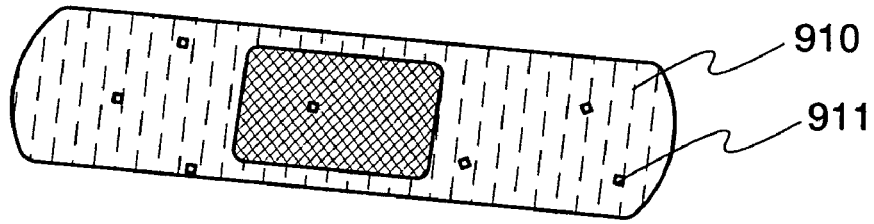

FIG. 8B shows an adhesive plaster 910 that corresponds to one mode of a packing material according to the present invention. The adhesive plaster 910 is provided with a plurality of dispersed wireless tags 911.

Figure 8C:
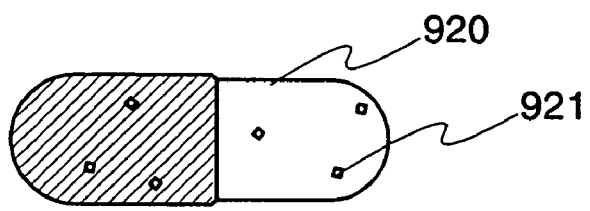

FIG. 8C shows a medicated capsule 920 that corresponds to one mode of a packing material according to the present invention. If a wireless tag is formed by a material having no ill effects to the human body, a packing material according to the present invention can be used as a medicated capsule 920 that can be delivered into the body. The capsule 920 is dispersed with a plurality of wireless tags 921. A medical error can be prevented by recording information on the medicine on the wireless tag.

Embodiment 4

In case that one possesses negotiable securities such as merchandise coupon or paper money, there is a threat that the amount of the securities or the paper money is unpredictably read by a third person. In this embodiment, a means for restricting reading of an amount of the securities or the paper money is explained.

Figure 6A:
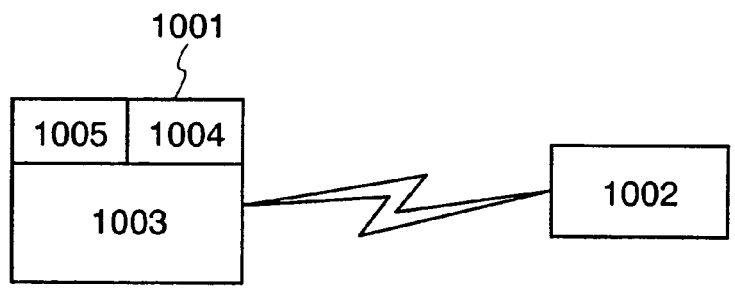
FIGS. 6A and 6B are explanatory views for showing a means for controlling reading of an amount of securities or paper money.

FIG. 6A shows a block diagram of a memory 1001 included in securities or paper money, and a reader/writer 1002. The memory 1001 comprises a region 1003 for storing an ID number for identifying securities or paper money, a region 1004 for storing a password for restricting reading of the ID number, and a region 1005 for storing a key signal for requiring reading of the ID number.

Figure 6B:
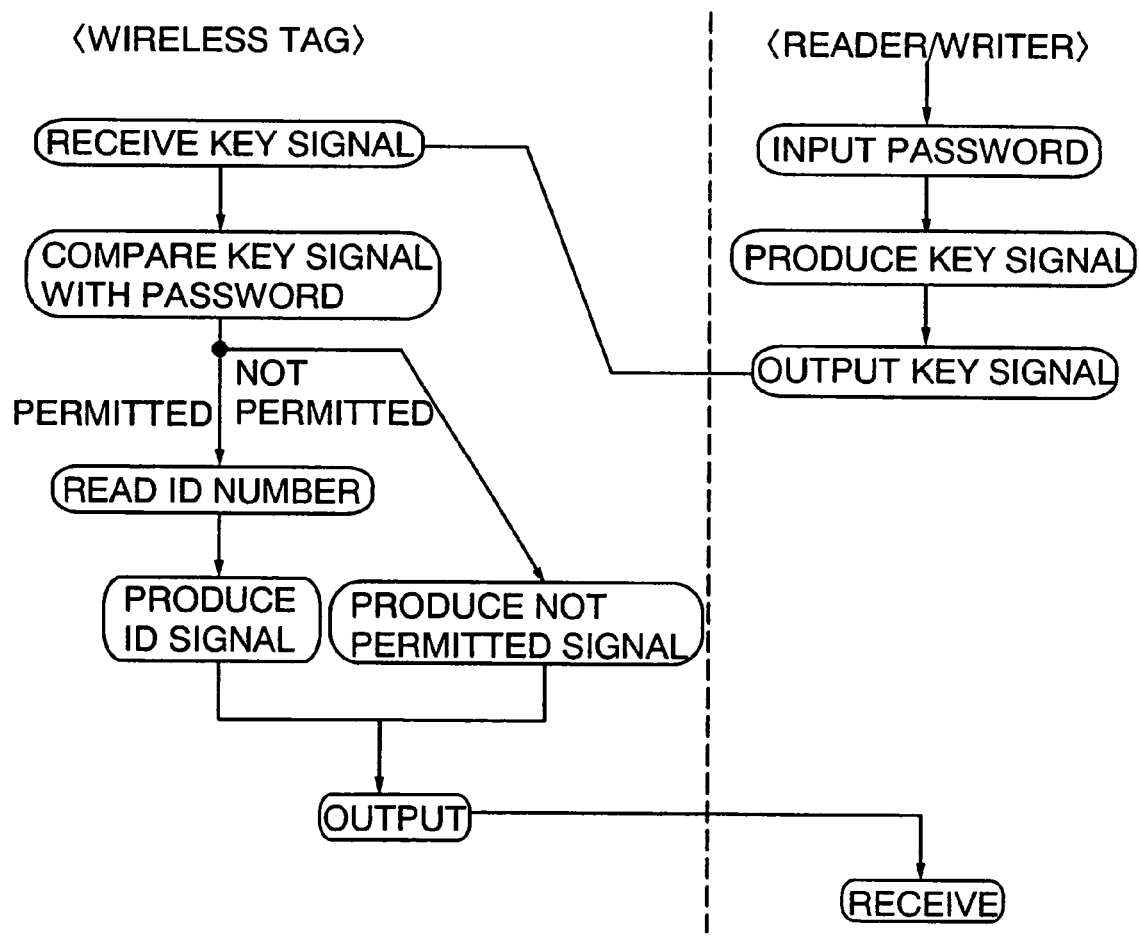

FIG. 6B is a flow chart for showing a flow of sending and receiving signals between the memory 1001 in a wireless tag and the reader/writer 1002.

As shown in FIG. 6B, upon inputting a password into the reader/writer 1002, a key signal including the password as information is produced. The reader/writer 1002 outputs the produced key signal to the wireless tag. The wireless tag receives the key signal, and the region 1005 stores the key signal. Then, the key signal is compared to a password that is preliminarily stored in the region 1004.

If the key signal corresponds to the password that is preliminarily stored in the region 1004, reading of the ID number is permitted. In this instance, the wireless tag reads the ID number from the region 1003 to produce a signal including the ID number as data (temporarily, ID number). On the other hand, if the key signal does not correspond to a password that is preliminarily stored in the region 1004, the reading of the ID number is not permitted. In this instance, a signal including the information that the reading of the ID number is not permitted (temporarily, not permitted signal) is produced. The produced ID number or the not permitted signal is outputted to the reader/writer.

The occurrence of crime can be prevented by restricting reading of an amount of negotiable securities or paper money.

Embodiment 5

Figure 7A:
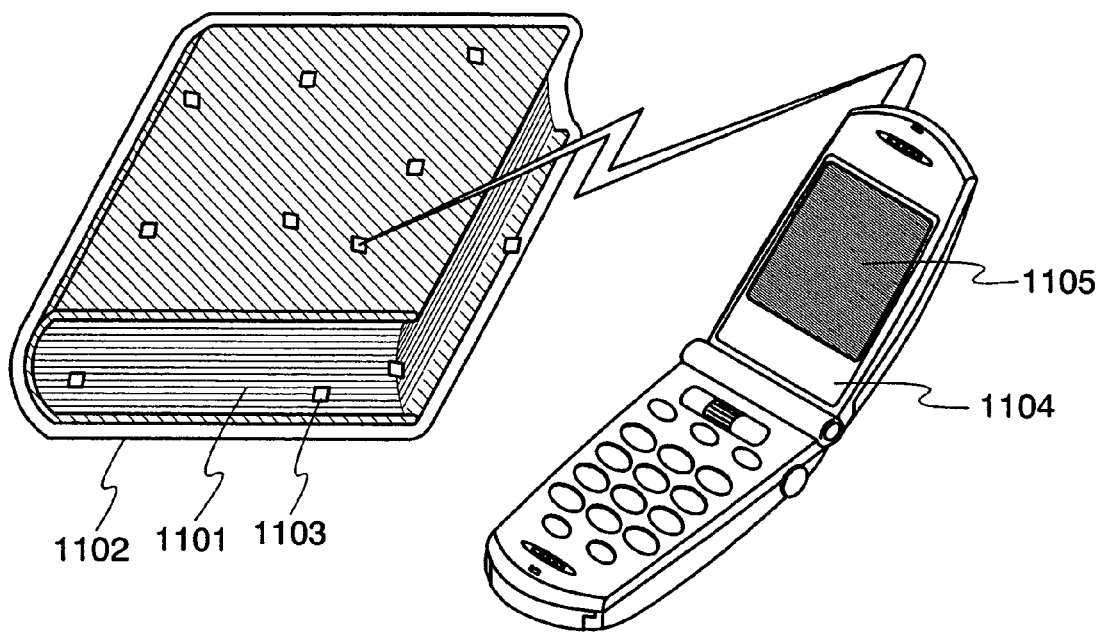
FIGS. 7A and 7B are explanatory views of a method for utilizing a packing material according to the present invention.

In this embodiment, a method for utilizing a packing material according to the present invention is explained. In case of products such as a book, a DVD, a CD, and the like as shown in FIG. 7A, each of which has a value on information inherent therein; the commercial value thereof is declined when all inherent information is disclosed. However, there is a problem that it is difficult to know the commercial value of the foregoing products when the inherent information is not disclosed at all.

By wrapping the foregoing products in a packing material according to the present invention to store a part of the information of the products in a wireless tag included in the packing material, a customer can know the value of the products without declining the value. FIG. 7A shows the state that a book 1101 is wrapped in a packing material 1102 according to the present invention. The packing material 1102 has a plurality of wireless tags 1103 to be dispersed at the periphery of the book 1101.

Figure 7B:
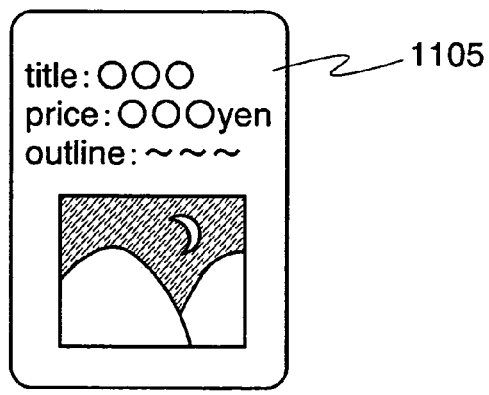

By adding the function as a reader/writer to a portable information terminal such as a cellular phone, a customer can know partly the contents of the book 1101. FIG. 7B shows the state that the contents of the book 1101 are displayed on a display portion 1105 of the cellular phone 1104.

According to the foregoing structure, a customer can know the contents of products without disclosing all information inherent in the products.

This application is based on Japanese Patent Application serial no. 2003-431753 filed in Japan Patent Office on 26th, Dec. 2003, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter described, they should be construed as being included therein.

What is claimed is:

1. A packing material comprising:
a plurality of wireless chips, each having an antenna and an integrated circuit electrically connected to the antenna;
wherein the plurality of wireless chips is randomly dispersed over a surface of a base material or randomly embedded dispersedly in the base material.

2. A packing material according to claim 1, wherein the integrated circuit is formed by a thin film transistor.

3. A packing material according to claim 1, wherein the base material has flexibility.

4. A packing material according to claim 1, wherein the base material has paper or plastic.

5. A packing material according to claim 1, wherein the integrated circuit comprises:
a rectification circuit for producing direct current power supply voltage by using an alternating signal inputted from the antenna;
a demodulation circuit for forming a first signal by demodulating the alternating signal;
a microprocessor for producing a second signal by arithmetic processing according to the first signal;
a modulation circuit for modulating the second signal; and
a switch for modulating a load on the antenna according to the second signal that is modulated.

6. A packing material according to claim 1, wherein the wireless chips have a memory.

7. A packing material according to claim 6, wherein the memory has a region for storing a password for restricting reading.

8. A tag comprising:
a plurality of wireless chips, each having an antenna and an integrated circuit electrically connected to the antenna;
wherein the plurality of wireless chips is randomly dispersed over a surface of a base material or randomly embedded dispersedly in the base material.

9. A tag according to claim 8, wherein the integrated circuit is formed by a thin film transistor.

10. A tag according to claim 8, wherein the base material has flexibility.

11. A tag according to claim 8, wherein the base material has paper or plastic.

12. A tag according to claim 8, wherein the integrated circuit comprises:
a rectification circuit for producing direct current power supply voltage by using an alternating signal inputted from the antenna;
a demodulation circuit for forming a first signal by demodulating the alternating signal;
a microprocessor for producing a second signal by arithmetic processing according to the first signal;
a modulation circuit for modulating the second signal; and
a switch for modulating a load on the antenna according to the second signal that is modulated.

13. A tag according to claim 8, wherein the wireless chips have a memory.

14. A tag according to claim 13, wherein the memory has a region for storing a password for restricting reading.

15. A certificate comprising:
a plurality of wireless chips, each having an antenna and an integrated circuit electrically connected to the antenna;
wherein the plurality of wireless chips is randomly dispersed over a surface of a base material or randomly embedded dispersedly in the base material.

16. A certificate according to claim 15, wherein the integrated circuit is formed by a thin film transistor.

17. A certificate according to claim 15, wherein the base material has flexibility.

18. A certificate according to claim 15, wherein the base material has paper or plastic.

19. A certificate according to claim 15, wherein the integrated circuit comprises:
a rectification circuit for producing direct current power supply voltage by using an alternating signal inputted from the antenna;
a demodulation circuit for forming a first signal by demodulating the alternating signal;
a microprocessor for producing a second signal by arithmetic processing according to the first signal;
a modulation circuit for modulating the second signal; and
a switch for modulating a load on the antenna according to the second signal that is modulated.

20. A certificate according to claim 15, wherein the wireless chips have a memory.

21. A certificate according to claim 20, wherein the memory has a region for storing a password for restricting reading.

22. Paper money comprising:
a plurality of wireless chips, each having an antenna and an integrated circuit electrically connected to the antenna;
wherein the plurality of wireless chips is randomly dispersed over a surface of a base material or randomly embedded dispersedly in the base material.

23. Paper money according to claim 22, wherein the integrated circuit is formed by a thin film transistor.

24. Paper money according to claim 22, wherein the base material has flexibility.

25. Paper money according to claim 22, wherein the base material has paper or plastic.

26. Paper money according to claim 22, wherein the integrated circuit comprises:
a rectification circuit for producing direct current power supply voltage by using an alternating signal inputted from the antenna;
a demodulation circuit for forming a first signal by demodulating the alternating signal;
a microprocessor for producing a second signal by arithmetic processing according to the first signal;
a modulation circuit for modulating the second signal; and
a switch for modulating a load on the antenna according to the second signal that is modulated.

27. Paper money according to claim 22, wherein the wireless chips have a memory.

28. Paper money according to claim 27, wherein the memory has a region for storing a password for restricting reading.

29. Securities comprising:
a plurality of wireless chips, each having an antenna and an integrated circuit electrically connected to the antenna;
wherein the plurality of wireless chips is randomly dispersed over a surface of a base material or randomly embedded dispersedly in the base material.

30. Securities according to claim 29, wherein the integrated circuit is formed by a thin film transistor.

31. Securities according to claim 29, wherein the base material has flexibility.

32. Securities according to claim 29, wherein the base material has paper or plastic.

33. Securities according to claim 29, wherein the integrated circuit comprises:
a rectification circuit for producing direct current power supply voltage by using an alternating signal inputted from the antenna;
a demodulation circuit for forming a first signal by demodulating the alternating signal;
a microprocessor for producing a second signal by arithmetic processing according to the first signal;
a modulation circuit for modulating the second signal; and
a switch for modulating a load on the antenna according to the second signal that is modulated.

34. Securities according to any one of claims 29 to 33, wherein the wireless chips have a memory.

35. Securities according to claim 34, wherein the memory has a region for storing a password for restricting reading.

* * * * *